United States Patent
Gibson, Jr. et al.

(10) Patent No.: US 9,317,832 B2
(45) Date of Patent: Apr. 19, 2016

(54) SYSTEM AND METHODS FOR PROVIDING USER SERVICES AT REMOTE LOCATIONS

(75) Inventors: Donald Ray Gibson, Jr., Coppell, TX (US); Douglas William Bonser, Flower Mound, TX (US); Paul Everrett Garrett, III, Flower Mound, TX (US); David Gerald Lewis, Jr., Collierville, TN (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 358 days.

(21) Appl. No.: 13/526,963

(22) Filed: Jun. 19, 2012

(65) Prior Publication Data

US 2013/0338822 A1 Dec. 19, 2013

(51) Int. Cl.
*G07F 17/12* (2006.01)
*G06Q 10/08* (2012.01)

(52) U.S. Cl.
CPC ............ *G06Q 10/0836* (2013.01); *G07F 17/12* (2013.01)

(58) Field of Classification Search
CPC .............................. G07F 17/12; G06Q 10/0836
See application file for complete search history.

(56) References Cited

U.S. PATENT DOCUMENTS

| | | | |
|---|---|---|---|
| 6,573,884 B1 * | 6/2003 | Kinzie | 345/156 |
| 6,690,997 B2 * | 2/2004 | Rivalto | 700/237 |
| 6,791,450 B2 * | 9/2004 | Gokcebay et al. | 700/233 |
| 7,174,029 B2 * | 2/2007 | Agostinelli et al. | 382/100 |
| 7,644,039 B1 * | 1/2010 | Magee et al. | 705/43 |
| 7,881,822 B2 * | 2/2011 | Thornton et al. | 700/244 |
| 7,948,376 B2 * | 5/2011 | DeLine | 340/540 |
| 8,145,351 B2 * | 3/2012 | Schininger et al. | 700/237 |
| 8,154,615 B2 * | 4/2012 | Fedorovskaya et al. | 348/222.1 |
| 2003/0025590 A1 | 2/2003 | Gokcebay et al. | |
| 2004/0083371 A1 | 4/2004 | Algazi et al. | |
| 2005/0104716 A1 | 5/2005 | Simms et al. | |
| 2006/0020489 A1 | 1/2006 | Rivalto | |

FOREIGN PATENT DOCUMENTS

| | | |
|---|---|---|
| CN | 201546572 | 8/2010 |
| DE | 10 2006 01443 | 10/2007 |
| JP | H01 256674 | 10/1989 |
| JP | H09 144401 | 6/1997 |
| JP | 2004 283491 | 10/2004 |
| KR | 2005 0026836 | 3/2005 |
| WO | WO 2009/018931 | 2/2009 |
| WO | WO 2011/036498 | 3/2011 |

OTHER PUBLICATIONS

Notification of Transmittal of International Search Report and Written Opinion, PCT/US2013/045075 mailed Nov. 26, 2013 (6 pages).
Written Opinion of the International Searching Authority, PCT/US2013/045075 mailed Nov. 26, 2013 (4 pages).
European Search Report dated Oct. 12, 2015, issued in EP Application No. 13 732 722.7 (5 paages).

* cited by examiner

*Primary Examiner* — Timothy Waggoner
(74) *Attorney, Agent, or Firm* — Finnegan, Henderson, Farabow, Garrett & Dunner, L.L.P.

(57) ABSTRACT

A delivery service system includes a cabinet having a plurality of controlled-access storage cells, located in a plurality of zones, a user interface, a user evaluation device, and a processor. The system receives a user request to accept an item for delivery, detects user physical characteristics, and provides user access to a storage cell in a selected zone, the zone being selected based on the detected user physical characteristics.

23 Claims, 12 Drawing Sheets

SYSTEM AND METHODS FOR PROVIDING USER SERVICES AT REMOTE LOCATIONS

FIELD

Disclosed embodiments relate to providing user services at a remote location.

BACKGROUND

Traditionally, in providing user services, such as acceptance of an item for delivery, a delivery service provider may arrive at a residence or place of business to pick up the item. However, without coordination between the user and the delivery service provider, multiple unsuccessful attempts to pick up the item may be made if the user is unavailable. This wastes time and money.

Therefore, systems are known which provide user services at remote locations. For example, locker systems may receive items placed by a user in a locker, or cell, of the system, and securely store the item until a delivery service provider arrives at the locker system to pick up the item.

However, locker systems may come in different shapes and sizes, and may have lockers located at various distances off the ground. Accordingly, a disabled person may not be able to have physical access to certain lockers. Also, it may be uncomfortable for a very tall person to access a locker near ground level. Therefore, there is a further need for a system that provides expanded access to users, including persons with disabilities or wheelchair-bound persons.

SUMMARY

In accordance with the disclosed embodiments a delivery system may include a cabinet, a plurality of storage cells having controlled access and being disposed in a plurality of zones within the cabinet, a user evaluation device configured to detect physical characteristics of a user, and a control processor. The control processor may be configured to provide, in response to a user request, physical access to cells located in a selected at least one of the zones, where the selection is based on detected physical user characteristics.

In accordance with the disclosed embodiments, an interactive user interface for a system providing user services, the services having functional characteristics and the user interface, may include a user evaluation device for detecting physical characteristics of a user and a processor. The processor may be configured to respond to a user request for services, select at least one of the functional characteristics based on the detected physical characteristics, and generate commands to cause an associated apparatus to provide at least one of the services having the selected at least one functional characteristic.

In accordance with the disclosed embodiments, a system providing services to a user may include a detector configured to detect physical characteristics of the user, a display device configured to present information prompting the user to provide inputs specifying the services, the information having a plurality of formats, an input device configured to receive the user inputs, and a processor. The processor may be configured to generate commands to the display device to display the information in a selected one of the formats, the format selection being based on the detected physical characteristics and to generate commands to associated apparatus to provide the specified service, the commands being based on the received user inputs In accordance with the disclosed embodiments, a method for receiving, from a user, a delivery item for delivery by a delivery service provider may include receiving a request from the user to deposit a delivery item in a cabinet, the cabinet comprising a plurality of controlled-access storage cells disposed in a plurality of zones within the cabinet; detecting physical characteristics of the user with a user evaluation device; providing, in response to the request, physical access to a selected cell located in a selected at least one of the zones, the selection being based on detected physical user characteristics, receiving the delivery item in the selected cell from the user; and providing access to the selected cell to only a delivery service provider.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present, exemplary embodiments disclosed herein, including examples of which are illustrated in the accompanying drawings. Wherever possible, the same reference numbers will be used throughout the drawings to refer to the same or like parts.

Disclosed embodiments include computer systems having a processor and computer-readable storage media that include code for instructions to perform disclosed processes. Disclosed embodiments can include various types of computer-readable memory or storage device, such as a random access memory, a read-only memory, a mass storage device such as a hard disk, a CD, a DVD, and the like. Disclosed embodiments can include monitors, track balls, mice, keyboards, and the like. Disclosed embodiments can be connected to computers, cell phones, and other systems using a network. Various computers and systems can exchange information among the network. Disclosed embodiments can be deployed on any operation system or platform such as Linux based operating systems.

Disclosed embodiments include methods and systems for adapting user interfaces according to user characteristics. Embodiments relate to a way of vertically or horizontally segmenting a software application's user interface to provide services to a range of users, including standing, wheelchair-bound, and any other persons with disabilities. Embodiments also relate to altering, such as mechanically or electronically altering, a user interface to provide services to a range of users. Embodiments relate to software that provides a user-specific visual and physical user interface.

Embodiments can be implemented in a locker system that provides packing shipping and delivery services to users. In some embodiments, an adaptive user interface can be included in a locker system to provide that items are located in lockers according to a user's characteristics. For example, if a user is wheelchair-bound, the user interface can accordingly accommodate this user by altering the user interface based on Americans with Disabilities Act (ADA) standards, thereby allowing the user to easily access the system. Embodiments may provide an improved experience for a range of persons with and without disabilities. Embodiments can relate to and include any kiosk or vending machine, such as a public facing kiosk.

Figure 1:
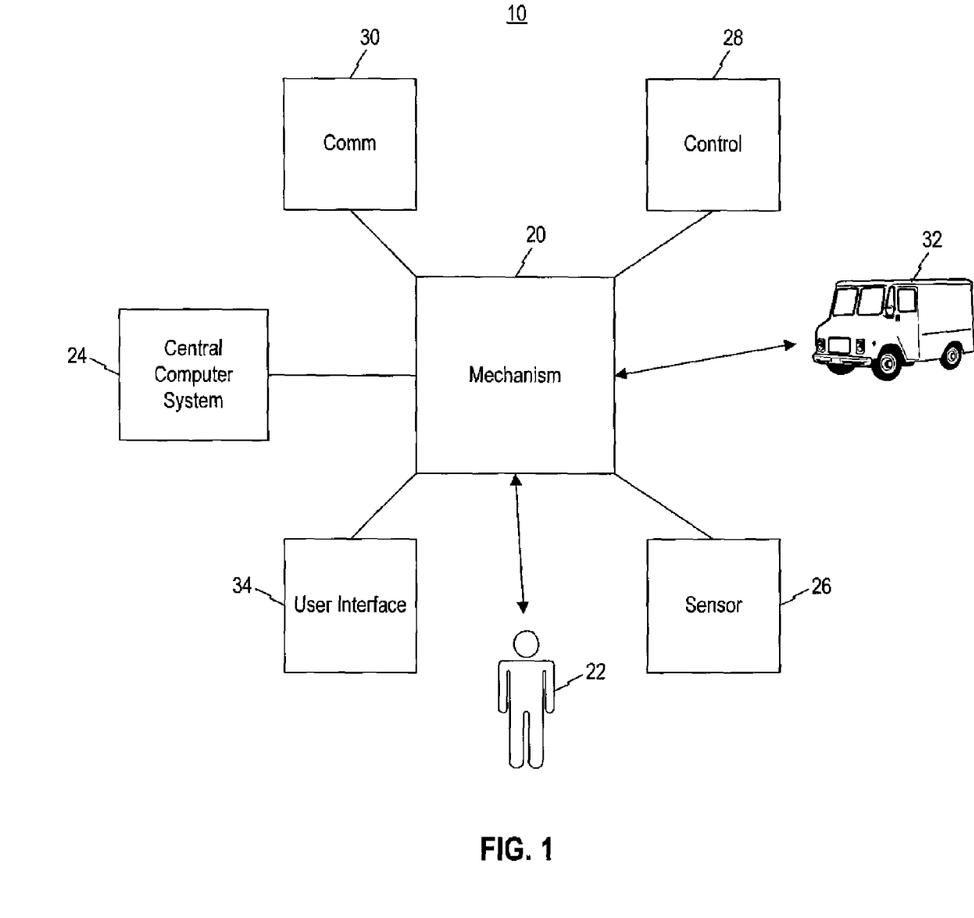
FIG. 1 is a block diagram of a user service system consistent with the disclosed embodiments.

FIG. 1 shows an exemplary user service system 10. System 10 includes a service mechanism, such as a locker cabinet 20, serving a user 22. Coupled to cabinet 20 is a user interface 34 and a user sensor 26. A controller 28 is also coupled to cabinet 20, along with an optional communication module 30. A delivery service provider 32 delivers and receives delivery items to and from cabinet 20.

Exemplary embodiments for the service mechanism are described as locker systems including cabinet 20. However, other embodiments can include kiosks, vending machines, or service machines. For example, embodiments can include shipping centers, clothing stores, beverage stores, general vending machines, copy machines, and the like, and combinations thereof.

Cabinet 20 may be accessed by users and delivery service providers to deliver and retrieve items to and from secure lockers, or "cells," in cabinet 20. Items can include parcels, letters, periodicals, and the like. The delivery service provider can leave a specific item for a specific user in a specific cell. The cell can be manually or electronically locked. The cell can be accessed by those having approved access, such as users, or delivery service providers.

Delivery service providers may either drop off or retrieve items using a login or PIN to access a specific user account used to ship, bill, buy, or retrieve items. A user also may either drop off or retrieve items. A user may gain access to cells of cabinet 20 in a number of ways, such as by scanning or swiping a form of identification, or by scanning or entering a code, login, or PIN.

Cell phones and other wireless devices may also access system 10. A user may either login to a website relating to system 10, call into system 10, or wirelessly access system 10 using a cell phone or other wireless device. This may save the user time when the user wants to check to determine if a specific item has been delivered to cabinet 20, to determine if there is an item waiting for the user, to determine if system 10 is available, or to determine the location of cabinet 20. The user can also receive and send emails to and from system 10, that update the user as to a status of an item. An email can include an ID number, code, or other identifier, and the user can use his phone to authenticate, key the code into system 10 for verification, or scan the code. This may enable the user to physically access an item inside cabinet 20. In a similar manner as with the wireless device, a computer can also access system 10.

Cabinet 20 can also interact with other locker systems. These other locker systems may communicate with cabinet 20 by sharing information such as location, ability to accommodate a particular item size, and other information.

A central computer system 24 may also connect and interact with the locker system. Central computer system 24 may be operated by a company, such as a delivery service provider, a vending company, or any other business or entity. Central computer system 24 can operate system 10 if needed, such as by controlling cameras, microphones, cells, monitors, and other components included in or related to system 10. Central computer system 24 can send and receive instructions to and from the system 10, and vice versa. Central computer system 24 can also interact and communicate with entities that communicate with cabinet 20, such as a users and delivery service providers.

Figure 2:
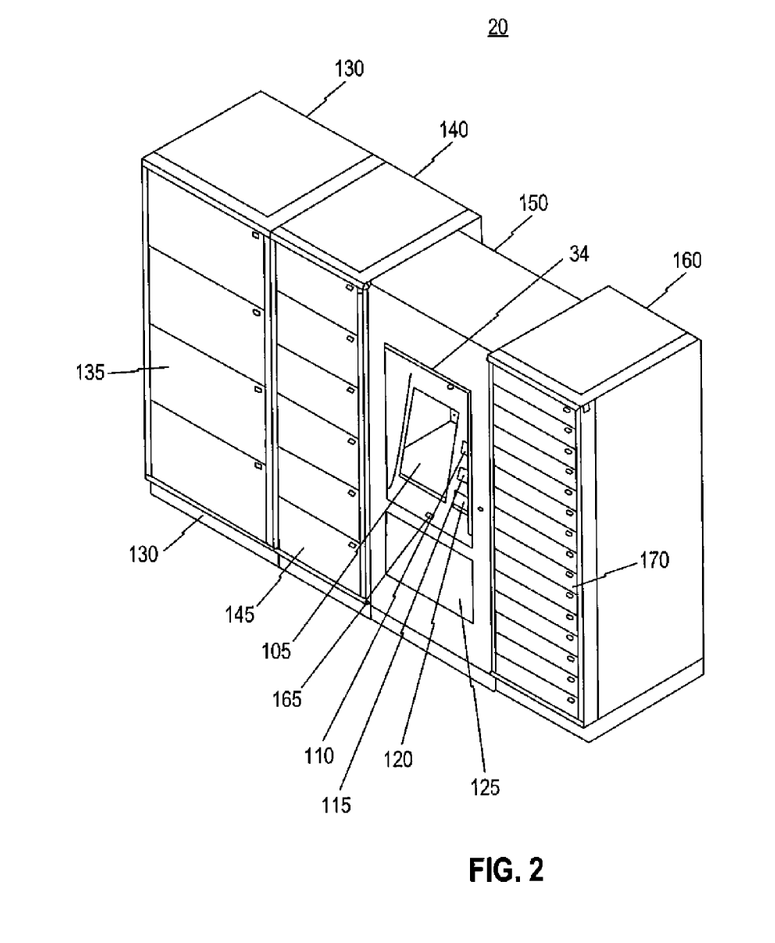
FIG. 2 is a perspective view of a locker system consistent with the disclosed embodiments.
Figure 3:
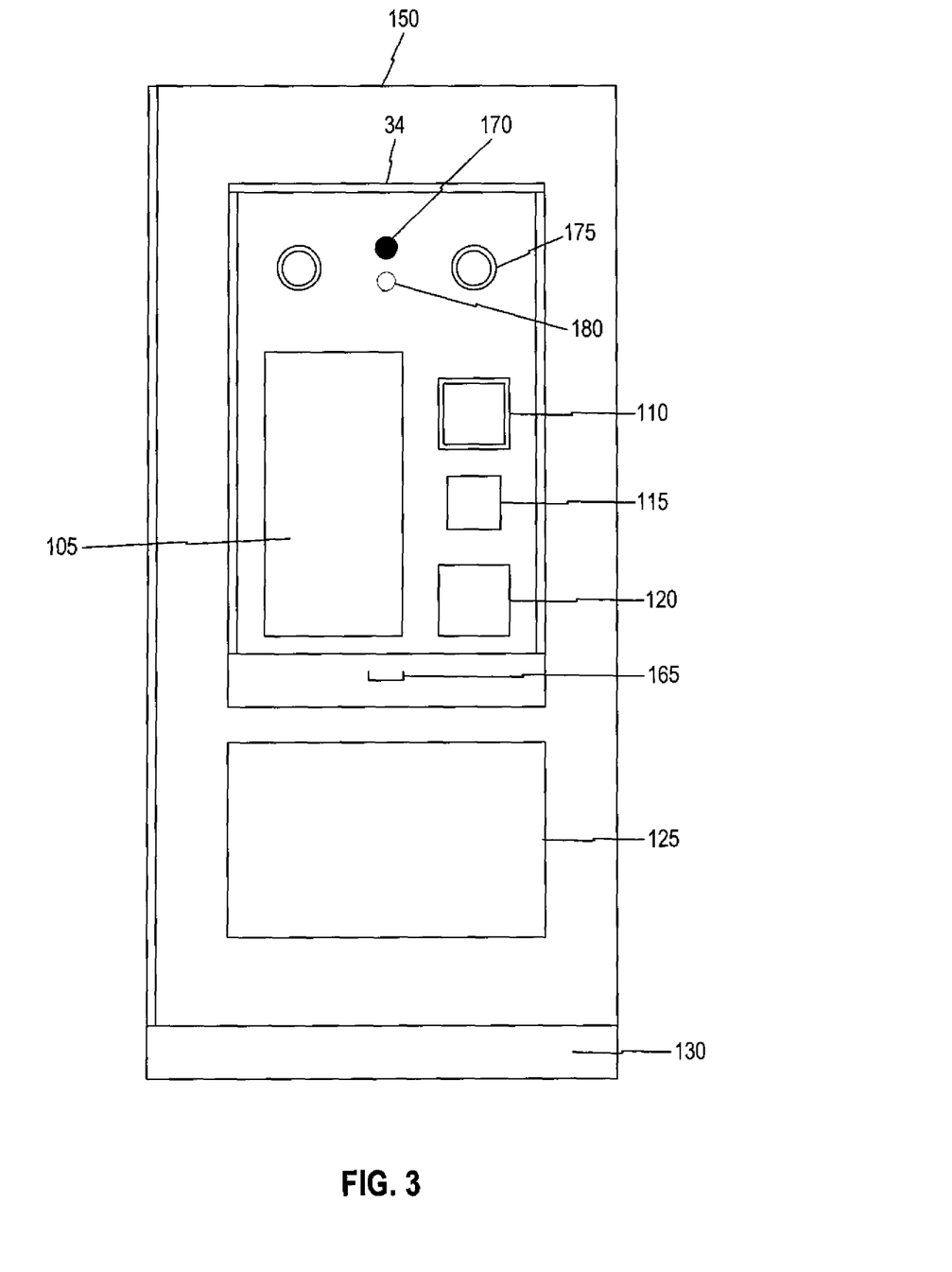
FIG. 3 is a front view of a portion of the system of FIG. 2.

FIG. 2 shows an exemplary embodiment of cabinet 20. Cabinet 20 may include a plurality of columns 130, 140, 150, and 160. Column 150 may include features providing a user interaction. As can be seen in FIG. 3, a front view of a portion of cabinet 20, column 150 is supported by a base 130 and houses a user interface 34 that includes a display 105. Display 105 can be a monitor, touch display, flat panel display, and the like. A user can input information into the locker system by entering information on the display, either by touch or other input device, such as a mouse or trackball. Display 105 can also display information to the user.

Cabinet 20 may include a user evaluation device 180, which may include sensor 26, to detect characteristics of a user. These characteristics may include physical characteristics, such as height, weight, reach, race, gait, or age of the user, or any other characteristic. These characteristics can be automatically captured by a detector or camera included in user evaluation device 180, and operated by controller 28. The detected characteristics can be used in determining a marketing or advertisement message that may be displayed on or in cabinet 20, such as on display 105.

The detected characteristics can also be used to modify the configuration of user interface 34, including display 105, to accommodate users with various characteristics. For example, a user in a wheelchair may be unable to reach higher than 48 inches off the ground. Therefore, when system 10 determines the characteristic that the user is wheelchair-bound, system 10 can either change the information format on display 105 to accommodate the user, or mechanically alter user interface 34, such as by lowering, or raising, or tilting it with a mechanical arm. User evaluation device 180 may also detect movement and noise in proximity to system 10, and use these detected factors to adjust user interface 34 or display a marketing message.

Cabinet 20 may include a card reader 115 and video camera 110. Card reader 115 can scan cards such as a drivers license, a credit card, etc., to identify and validate a person's identity, to pay for a service, and the like. Video camera 110 may be used to view a user's identification, such as a drivers license, to identify and validate a person's identity, to pay for a service, and the like. Video camera 110 may also be used in the same manner as user evaluation device 180, such that video camera 110 may be used to detect characteristics of a user. Cabinet 20 may include a printer and printer panel 125. Printer and printer panel 125 maybe used to print labels, receipts, and other documents and information, which may or may not relate to cabinet items.

Cabinet 20 may further include a keypad 120 to receive user input, and a scanner 165. Scanner 165 may be used to scan items, bar codes, cell phone screens, biometric characteristics of a user, and the like to determine information related to a user or a specific item. Thus, a user may use scanner 165 to identify the user or to identify an item to be deposited or retrieved from cabinet 20.

Cabinet 20 may also include a microphone 170 and speakers 175. These items, together with controller 28 and user evaluation device 180, may be used to contact a user care or help center, thereby enabling a video chat between the user and the center. The help center may be operated by the same entity that operates central computer system 24, or may be a different entity.

Referring to FIG. 2, column 150 is positioned between columns 130, 140, and 160. However, columns can be arranged in a plurality of configurations. Column 130 houses large-sized cells 135, column 140 houses medium-sized cells 145, and column 160 houses small-sized cells 170. The cells of cabinet 20 can be any shape, such as rectangular, spherical, and the like. The cells may have doors that lock and unlock, mechanically and/or electrically, according to the operation of system 10. This allows a user to securely deposit or retrieve an item from a cell.

Cells may be arranged in zones, based, for example, on a height requirement or a width requirement. For example, a first zone could be defined to include cells that are less than 54 inches off the ground and more than 9 inches off the ground. A second zone could be defined to include cells that are more than 54 inches off the ground and less than 9 inches off the ground. This may be helpful for accommodating short or tall users, wheelchair-bound users, or other users with a disability that may not be able to reach up, down, or to the side as far as a user without a disability.

Accordingly, when a user desires to deposit an item in a cell, the user's physical characteristics are detected by the user evaluation device 180. System 10 uses the detected characteristics to suggest or select a locker for a user. For example, when a user approaches cabinet 20, and begins to use services of cabinet 20, the user's detected characteristics will be used to select which zone of cells will be best suited for those detected characteristics. If the user desires to deposit an item, then those cells only within the selected zone will be available to the user. Alternatively, the zones may be pre-configured such that specific cells are included in specific zones without using user characteristics.

Additionally, the zones may be dynamically determined based on detected characteristics. For example, before a user approaches cabinet 20, the zones are not specified in system 10. After system 10 has detected the characteristics of the user, the zones can be created based on these characteristics, thereby accommodating the specific user. Therefore, a taller user's characteristics may create a zone having a greater height than a shorter user's characteristics, and vice versa.

In some embodiments, a user may wish to retrieve an item from cabinet 20. A user's information and characteristics may be stored in cabinet 20 or central computer system 24 as an account. The user's characteristics may have been previously detected by the sensor 26 and user evaluation device 180, or previously entered by the user, for example, through a wireless device, computer, or through user interface 34. When a delivery service provider tries to deposit an item at system 10 for the user, the delivery service provider may scan a code, for example, on the item using the scanner 165. The user's stored information and characteristics can then be accessed, and used to determine into which zones of cells the delivery service provider may deposit the item.

If for some reason, the detected user characteristics are incorrect or inappropriate for a desired action, the user may modify them. The user can enter information on user interface 34 to modify or change the detected user characteristics. Further, the user may bypass the detection of characteristics, and enter characteristics manually into cabinet 20 through user interface 34.

Figure 4A:
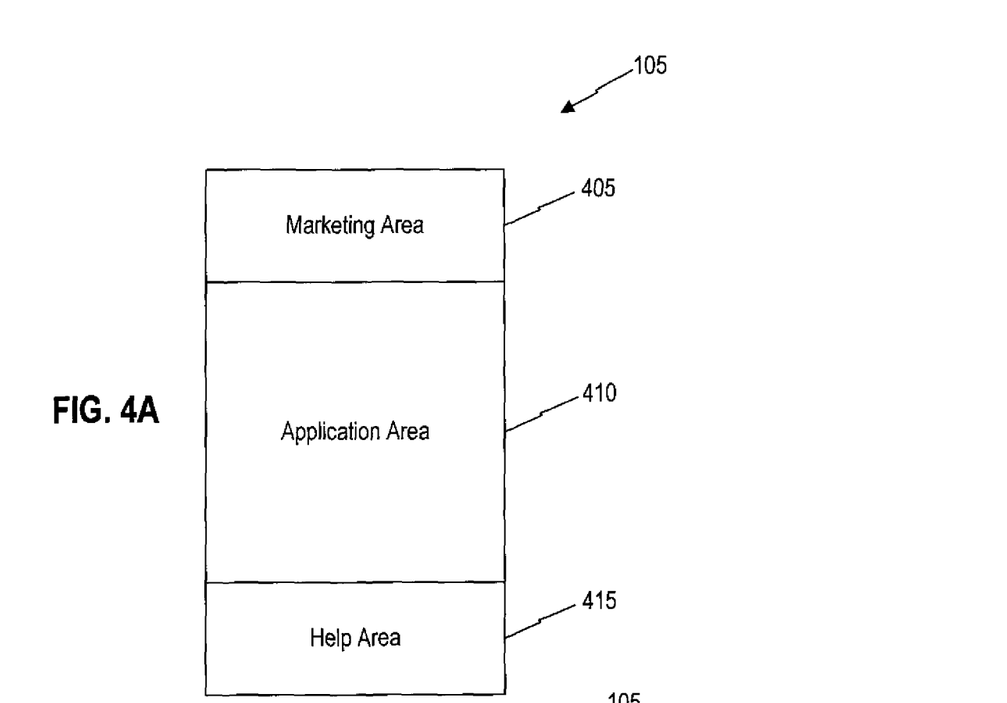
FIGS. 4A, 4B, and 4C illustrate display screens of the system of FIGS. 2 and 3.
Figure 4B:
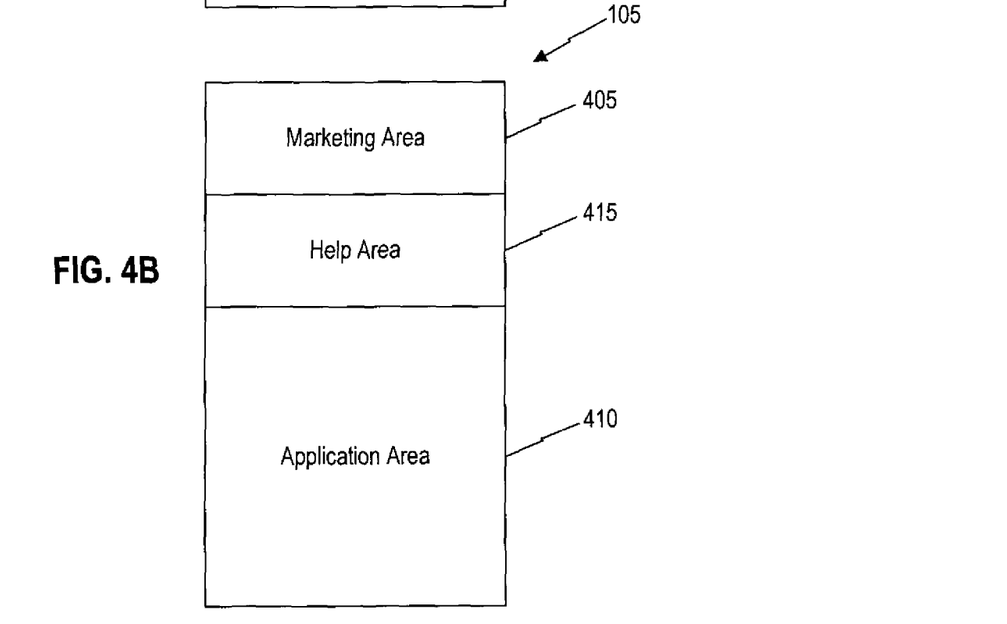
Figure 4C:
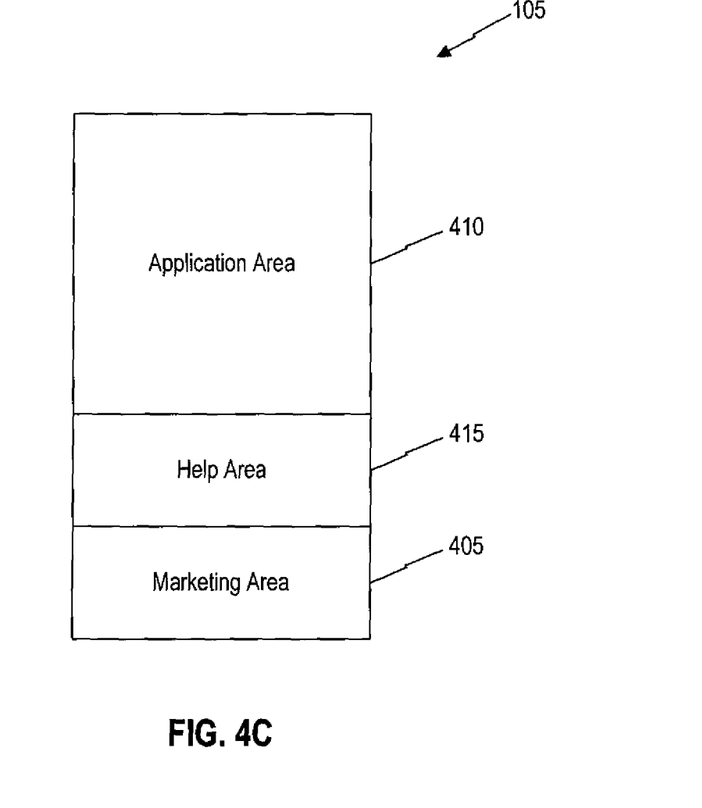

FIGS. 4A, 4B, and 4C show various exemplary formats of display 105 in user interface 34. The display 105 may have a marketing area 405, an application area 410, and a help area 415. Each area can occupy a different portion of display 105. Each format has a different arrangement of these areas. For example, after a user's characteristics have been detected, display 105 may alter the arrangement of the areas according to the detected characteristics, thereby accommodating various user's characteristics. Because the application area 410 is located toward the middle of the display 105 in FIG. 4A, and the help area 415 is located toward the bottom FIG. 4A would be presented to a user of medium height, for example. This may be because application area 410 is the area where the user will enter and see most of the information related to a service of cabinet 20. Therefore, application area 410 may be positioned in the most comfortable level and location for the user based on the detected user characteristics.

Accordingly, FIG. 4B may be a format presented to a user of short height, such as a child or person in a wheelchair. That is, application area 410 is positioned at the bottom of the user interface 34, and help area 415, a less commonly used area, is positioned above application area 410. Likewise, the format of FIG. 4C may be displayed to a tall person.

Other formats, not shown, can be used. For example, the areas on display 105 may be arranged in a horizontal manner, such that application area 410 is in the middle of help area 415 and marleting area 405.

Application area 410 may be an interactive area, for example, a touch pad, in which a user enters and receives information regarding system 10. Help area 415 may also be an interactive area, which may also provide services such as assistance and video chat. Marketing area 405 may also be an interactive area, which may provide marketing services.

FIGS. 5-10 describe exemplary embodiments of uses of cabinet 20. Steps in FIGS. 5-10 may be omitted, rearranged, or combined.

Figure 5:
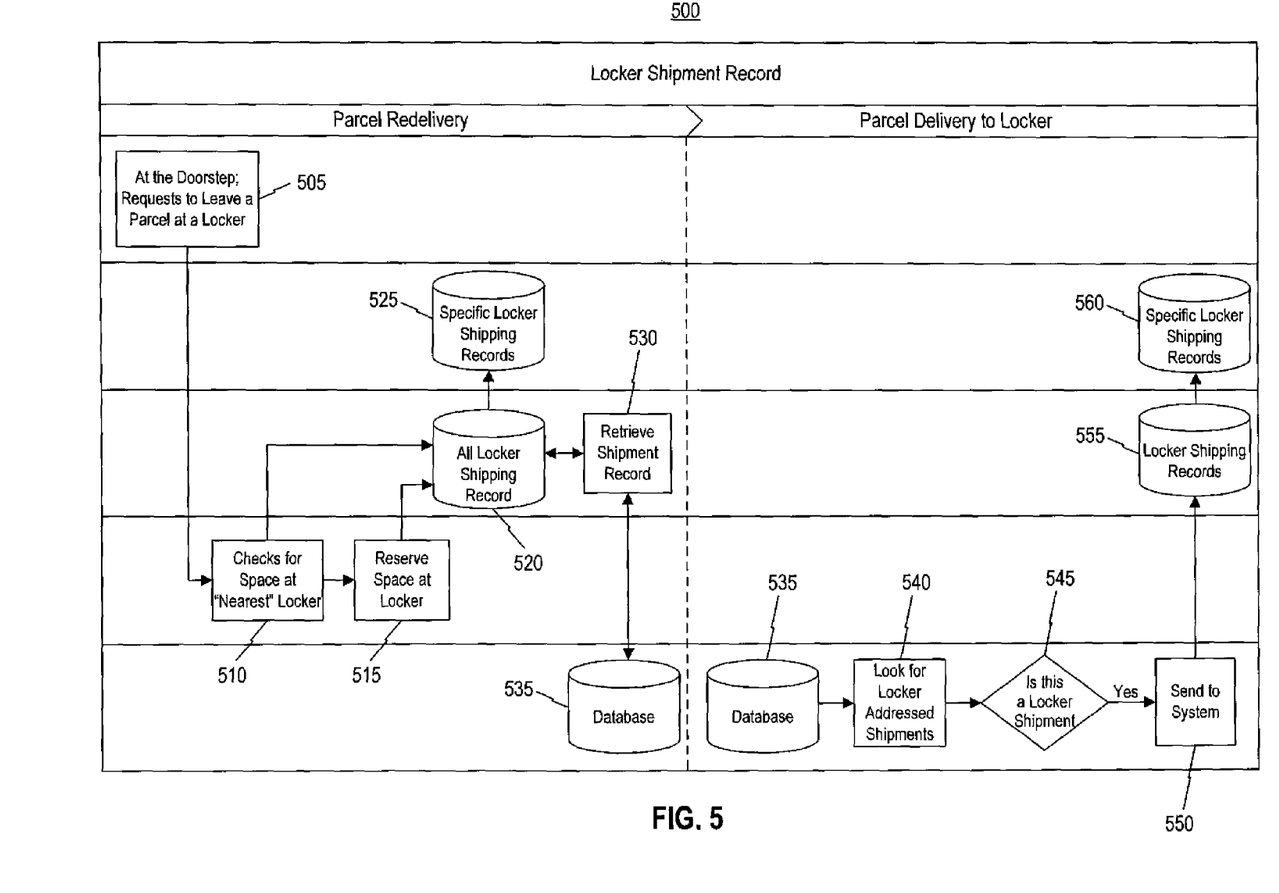
FIG. 5 is a flow chart illustrating operation of the system of FIGS. 2 and 3.

FIG. 5 shows an embodiment of recording a locker shipment record and reserving a particular locker at a particular location for pick-up by a user-recipient at cabinet 20. Process 500 begins at step 505, when a delivery service provider attempts to deliver an item at, for example, a doorstep of a user's home or business. If the user is not available, the delivery service provider may leave a note at the house, which may include a code, bar code, or other form of identification of the item attempted to be delivered. The delivery service provider then checks with customer service or dispatch to determine an available locker system, step 510. This check can be made in a variety of ways, such as by telephone, by wireless device, or the like. From here, the process can proceed either to step 515 or step 520. At step 515, the delivery service provider reserves a space at a locker system, then the process proceeds to step 520. At step 520, a locker shipping record is matched with a shipping record of the delivery item, retrieved at step 530 from a database 535. At step 525, a record consisting of the locker record and item record is created and stored, to facilitate loading of the item in a specific cell of cabinet 20 by the delivery service provider.

Alternatively, at step 540, records from database 535 are searched for items that were originally addressed for delivery to the recipient via the locker system. At 545, it is determined if a specific item is for locker delivery. if yes, then the record is sent at 550 to a locker system management system at central computer system 24 (FIG. 1). At 555, records for available locker cells are searched, and a specific cell record is associated with the item shipment record, and stored at 560 for loading of cabinet 20 by a delivery service provider.

Figure 6:
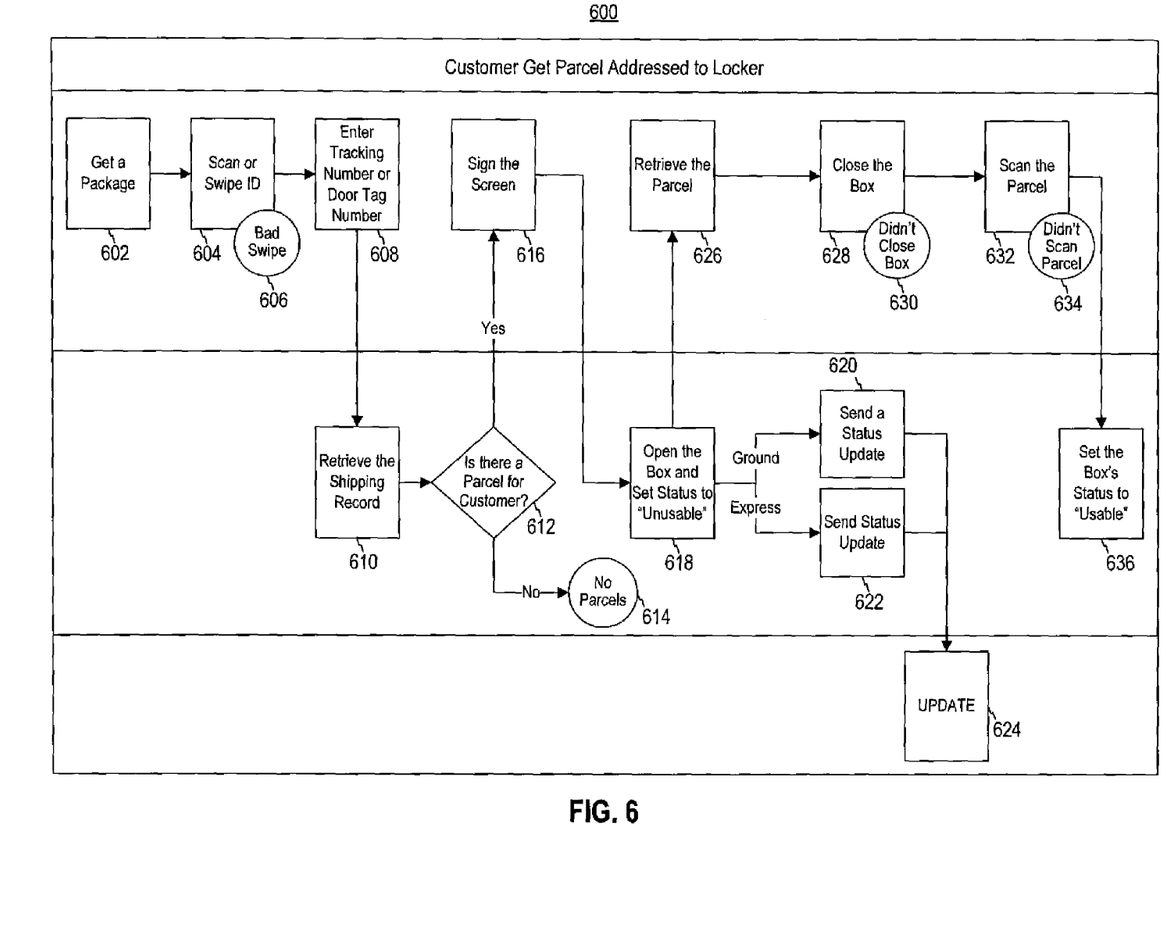
FIG. 6 is a flow chart illustrating user retrieval of an item addressed to a user from a locker in the system of FIGS. 2 and 3.

FIG. 6 shows of a process 600 for cabinet 20 in which a user may retrieve an item addressed for delivery to the user at cabinet 20. At 602, a user begins the process of retrieving a item from a cell. At 604, the user provides information, such as personal information to identify the user, by scanning or swiping identification. The identification can be anything that identifies the user, such as a credit card, ATM card, government identification, and the like. At 606, if there is a bad swipe, the system may ask the user to swipe again. Then at 608, the user may enter or scan a code to identify a specific delivery item. The code may be, for example, a bar code, a tracking number, or a number on a doortag left by a delivery service provider.

At 610, the shipping record of the item is retrieved from cabinet 20. At 612, it is determined if an item for this user has been stored in cabinet 20. If not, the process goes to 614, quits, and may restart. If yes, then the process goes to step 616, in which a sign-on screen is presented on user interface 34 requesting a user's signature or login. Then system 10 unlocks the specific cell containing the item, and sets the status of that cell as "unusable." Then the process may continue to either step 620 or 622, in which appropriate status codes are sent as status updates to central computer system 24. The status updates are then noted in central computer system 24 at step 624.

After the cell is unlocked at step 626, the user retrieves the item from the cell. The door of the cell may then be closed either automatically by system 10 or by the user at step 628. If the cell is not closed at 630, user interface 34 may ask the user to close the cell, or system 10 may automatically try to close the cell again.

The cell can be "opened" and "closed" in other ways besides unlocking a door, such as moving up or down, or tilting itself in and out to expose the delivery item. At step 632, the user is asked to scan the item, and then the process moves to 636. If the item is not scanned at 634, the process can continue to 636 after a predetermined period of time. Also, there may be sensors, scales, cameras, and the like inside the cell to determine if an item has been deposited or removed.

Figure 7:
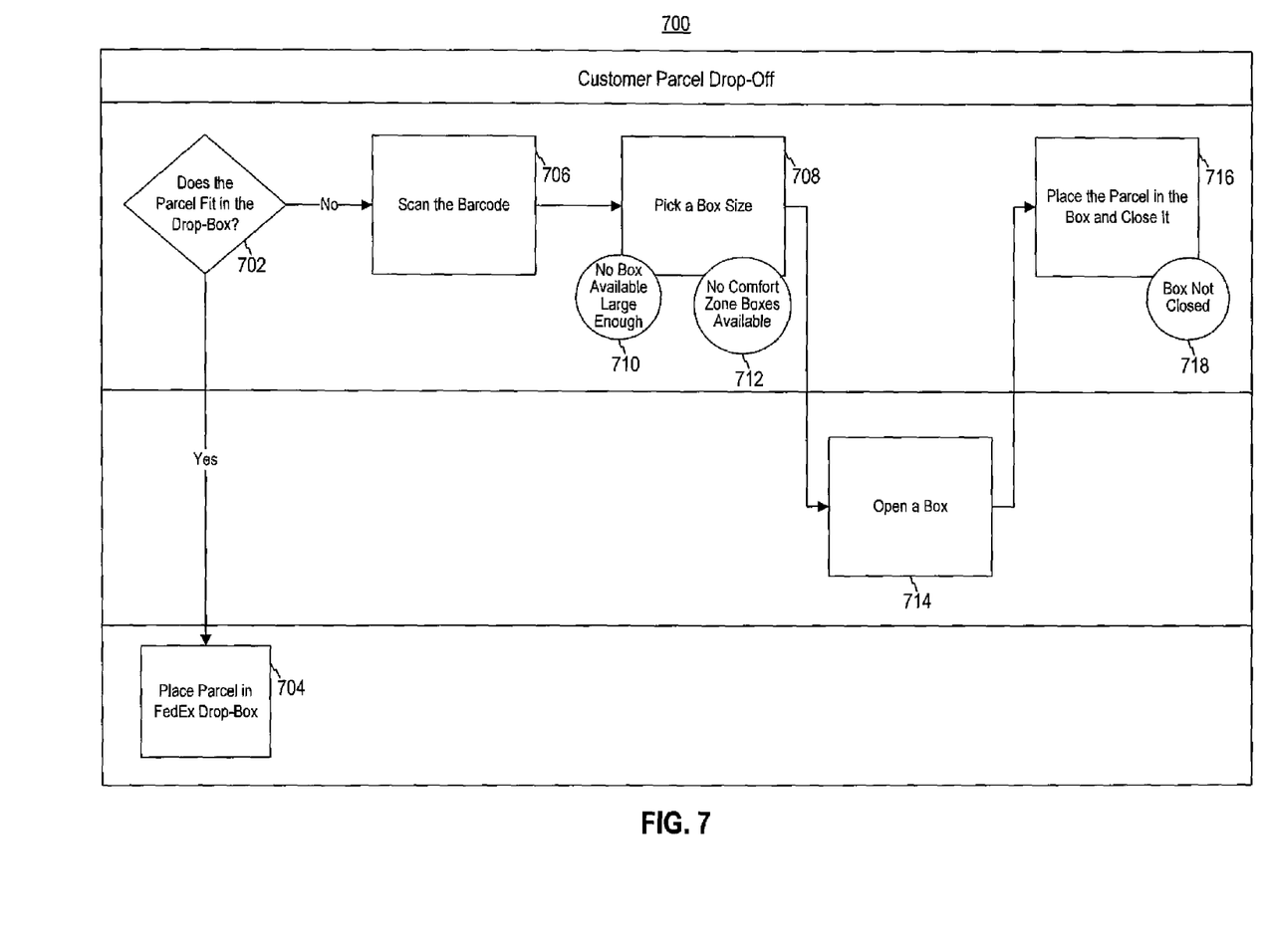
FIG. 7 is a flow chart illustrating user drop-off of an item in the system of FIGS. 2 and 3.

FIG. 7 shows a process 700 for handling a user drop-off at cabinet 20 of an item with a label for shipping. The label may be printed by the user before using cabinet 20, or be printed at cabinet 20. Process 700 may be used for a plurality of shipping options, such as normal or express delivery. At step 702, the user may check to see if the item will fit in a drop box (not shown) associated with cabinet 20. If the item does fit in a drop box, the user may choose to place the item in the drop box, shown at step 704. if the item does not fit in the drop box, the user may scan a bar code on the item at 706. The user may have obtained the bar code on a label from system 10 using vending services, or may have attained the bar code by other means. At step 708, a cell size is selected, either by the user or by system 10. For example, system 10 provides a video or audio request for a size of the item to be shipped to determine a cell size to be used. If cabinet 20 does not contain a cell large enough to receive the item, the user may be asked to travel to another locker system or to a shipping center at step 710. At step 712, using the characteristics of the user detected by sensor 26, it is determined if a cell of a size suitable to receive the item is available in a zone compatible with the detected user characteristics, that is, if any "comfort zones" are available. If no cells in comfort zones are available, the user may be asked if the user would like to use another zone or be asked to go to another locker system or shipping center.

If a cell that meets the above criteria is available, cabinet 20 causes the cell to open at step 714. At step 716, the user places the item in the cell. The cell is then closed and locked by the user or cabinet 20. At step 718, it is determined if the cell is closed, and if not, the system may request the user to close it or system 10 may try again to close the cell.

Figure 8:
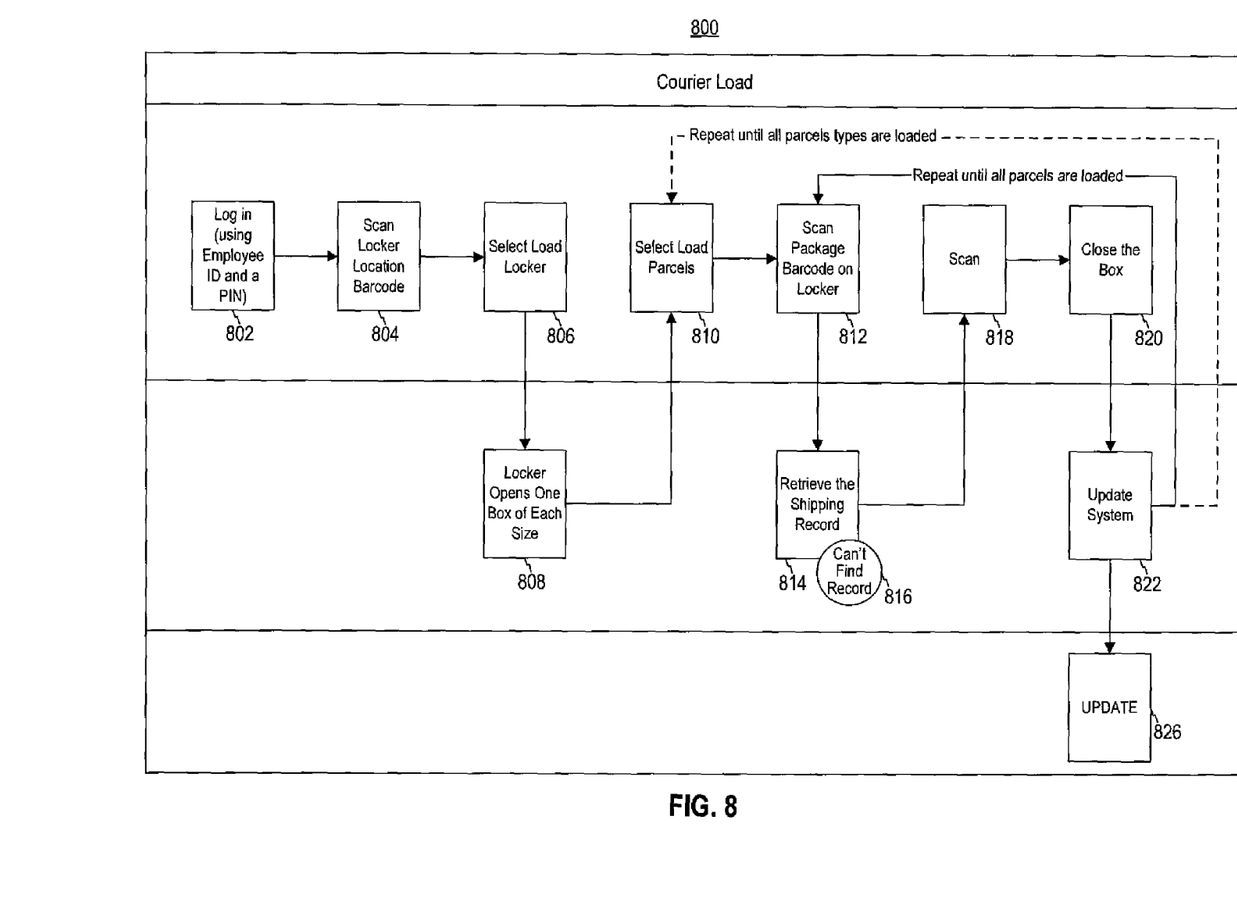
FIG. 8 is a flow chart illustrating loading of the system of FIGS. 2 and 3.

FIG. 8 shows a process 800 for loading delivery items in cabinet 20 by a delivery service provider. At step 802, the delivery service provider logs into system 10 using information such as an employee ID or a PIN. At 804, the delivery service provider may scan a bar code on cabinet 20 to register the location of cabinet 20 for deposited items. At 806, the delivery service provider enters a Load Locker command into cabinet 20. At step 808, one of each size cells opens. At step 810, the delivery service provider enters a Load Parcels command, and at 812, scans a bar code for the first item to be stored in cabinet 20. At 814, the shipping record is received for the scanned item. If a record cannot be found, the delivery service provider may call for assistance and the like. At step 818, the delivery service provider performs tasks required by a handheld scan of the item to create a status update for the item, and at step 820, loads the item into a specified cell (if determined from the shipping record) and closes the cell now containing the item. At 822, the status update, including the identity of the occupied cell, is sent to central computer system 24 at 826. At 824, the process returns to step 810, and performs all the steps that follow 810, for each item, until all the items are loaded in cabinet 20.

Figure 9A:
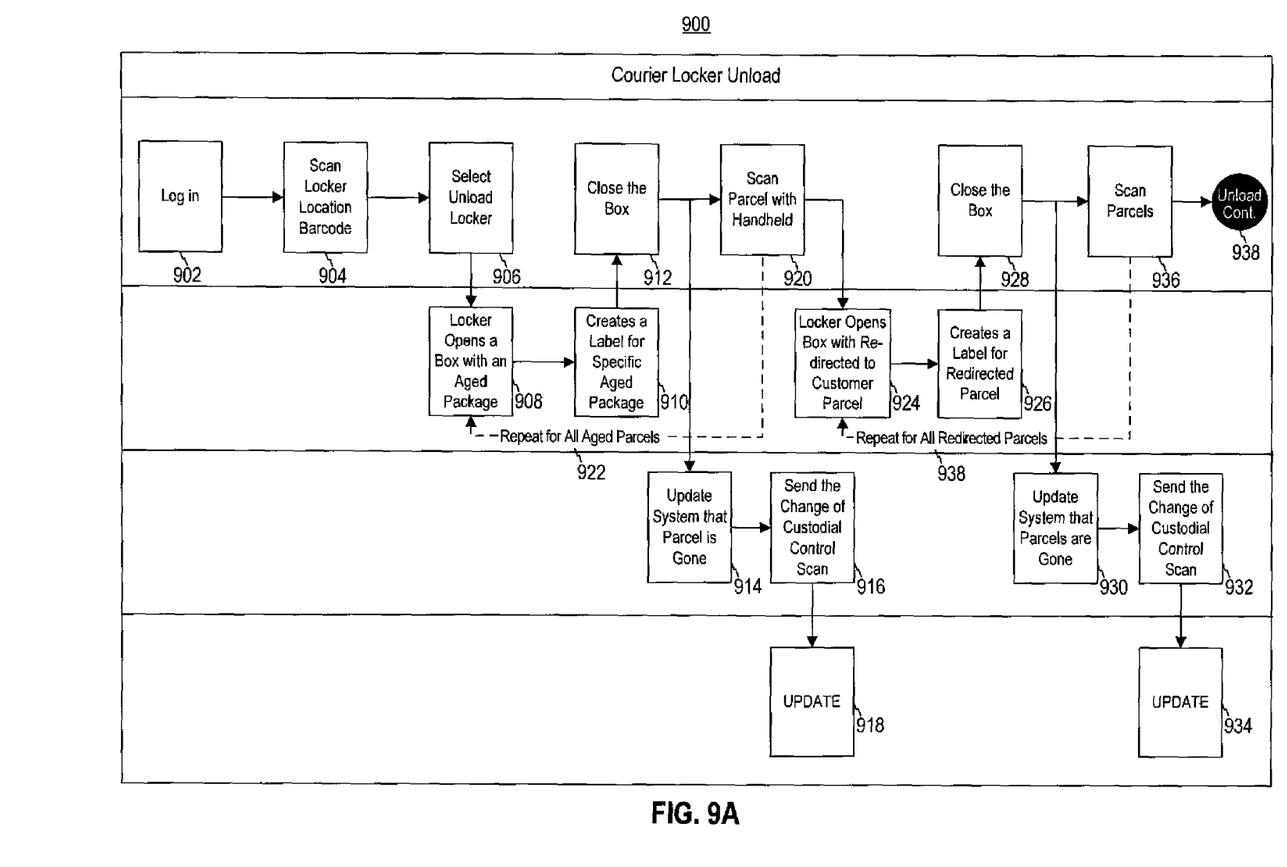
FIGS. 9A and 9B are flow charts illustrating a process for unloading of the system of FIGS. 2 and 3.
Figure 9B:
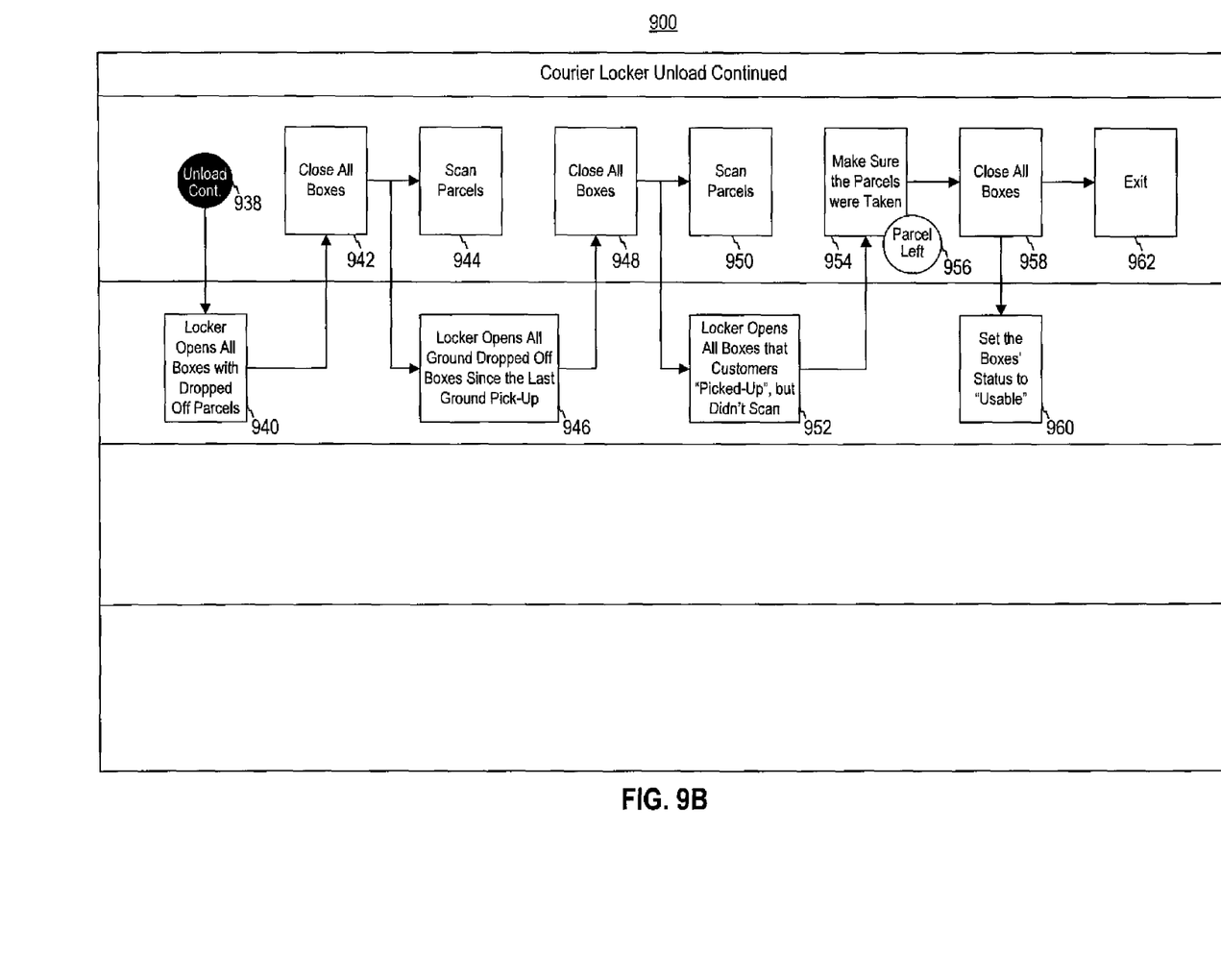

FIGS. 9A and 9B show a process 900 for a delivery service provider unloading items from cabinet 20. At 902, the delivery service provider may enter information such as an employee ID or PIN into system 10. At 904, the delivery service provider scans the location barcode of cabinet 20 to indicate its location. Then at 906, the delivery service provider enters a command to unload cabinet 20. At 908, system 10 opens a cell containing an "aged" item. An aged item is an item that has been in the locker for more than a predetermined period of time. After this time period, the aged item may be taken back to a shipping station, moved to another locker system, or taken to another location. At 910, a label is created for the aged item and the item is removed from the cell. At 912, the cell is closed. At 914, system 10 is updated to indicate that the aged item is no longer in cabinet 20, and custodial control status is changed from cabinet 20 to the delivery service provider at 916. Central computer system 24 is updated at 918. Continuing, at 920, the delivery service provider performs a handheld scan of the item, and at 922, the process returns to 908 to continue for other aged items in cabinet 20.

At 924, system 10 opens a cell containing an item that has been redirected to be delivered at a user's location. At 926, a label is created for the redirected item, and then at 928, the cell is closed. At 930, system 10 is updated, and custodial control is changed to the delivery service provider at 932, which is then updated in central computer system 24 at 934. At 936, the delivery service provider scans the redirected item to register the item as picked-up, and the process continues at 938.

At 940, system 10 opens all cells that house dropped-of items. At 942, the delivery service provider closes all the cells, and at 944, scans the items registering it as picked up. Continuing at step 946, system 10 opens all cells containing shipments that have been dropped off since the last pick-up. At 948, the delivery service provider closes all the cells, and scans the items at 950. At 952, system 10 opens all cells that the users picked up but did not scan, and, at 954, the delivery service provider makes sure the items were indeed taken. If the items were not taken, the delivery service provider can contact the user or update the system, and the like at 956. At 958, the delivery service provider closes all the cells. Continuing at step 960, cabinet 20 sets the status of the cells in cabinet 20 to "usable," and the process exits at 962.

Figure 10:
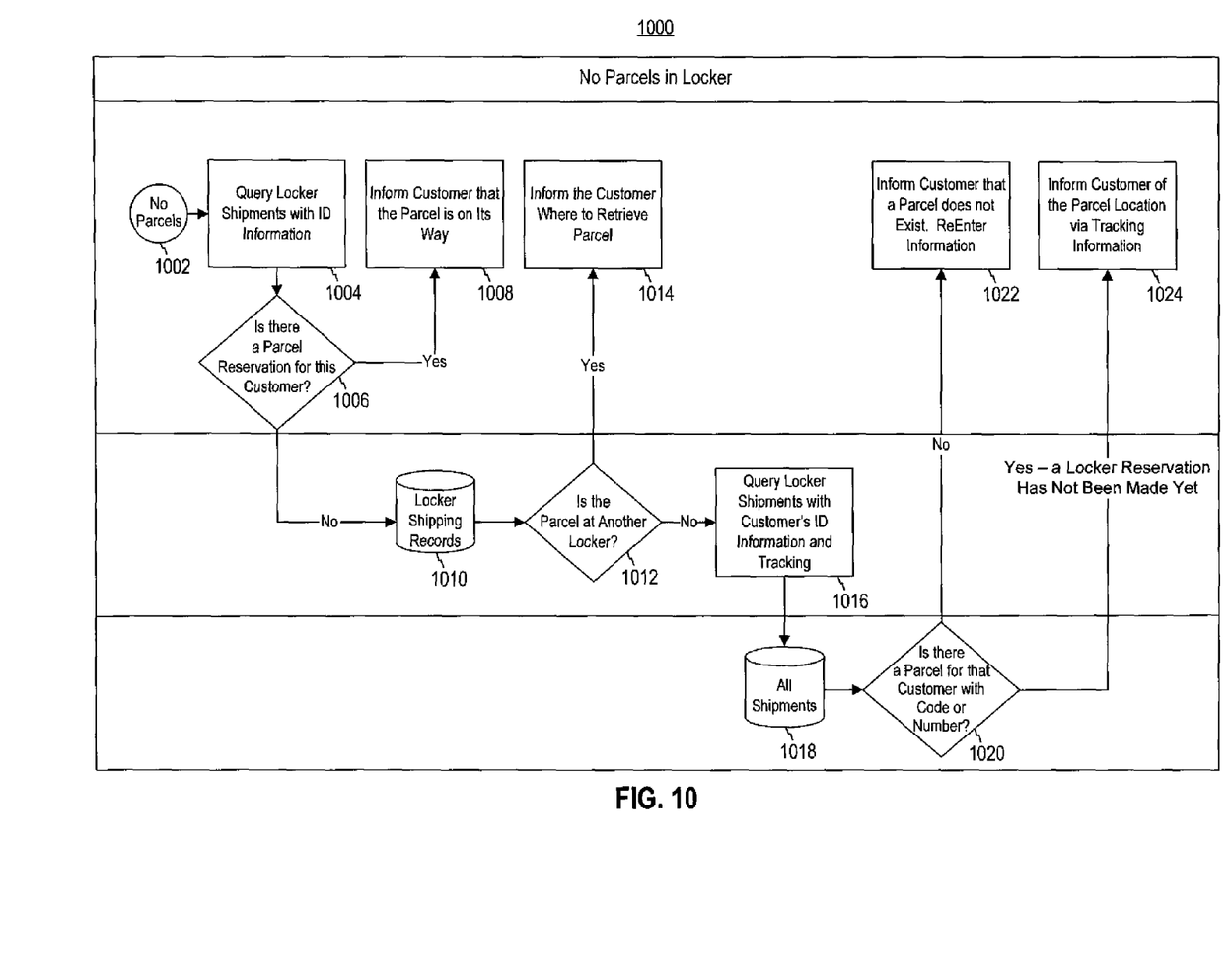
FIG. 10 is a flow chart illustrating a situation when a user has reported an item is not in the system of FIGS. 2 and 3.

FIG. 10 shows a process 1000 for handling a situation in which a user is expecting delivery of an item at cabinet 20 but has reported that the item is not in cabinet 20. At 1004, the locker shipment records are searched for the user's ID information and tracking information. At 1006, it is determined if there is a reservation for this user. If there is a reservation, the process continues to 1008 where system 10 informs the user that the item is still in transit, using information that may be stored in cabinet 20 or central computer system 24. If there is no reservation for a user, the process continues to 1010, and proceeds to search all locker shipping records. It is then determined if the item may be at another locker system at 1012, and if so, continues to 1014 to inform the user where to retrieve the item. If the item is not determined to be at another locker system, cabinet 20 searches the system's shipments with the user's information at 1016. The search may include searching all the shipment records on central computer system 24 at step 1018. At 1020, it is determined if there is an item for that particular user with the expected tracking number, code, or ID number. If not, the user is informed that the item for that particular information does not exist, and may be asked to re-enter the information at 1022. If there is an item that matches the user's information, the process continues to 1024 to inform the user of the item's location.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. Although some embodiments have been described in detail with reference to the accompanying drawings, the present disclosure is not limited to such embodiments. It should be understood by those skilled in the art that various modifications, combinations, sub-combinations and alterations may occur depending on design requirements and other factors insofar as they are within the scope of the appended claims or the equivalents thereof. Further, it should be understood that, as used herein, the indefinite articles "a" and "an" mean "one or more" in open-ended claims containing the transitional phrase "comprising," "including," and/or "having."

What is claimed is:

1. A delivery system, comprising:
   a cabinet including a plurality of zones;
   a plurality of controlled-access storage cells being disposed in each zone in the plurality of zones within the cabinet;
   a user evaluation device configured to detect physical characteristics of a user; and
   a control processor configured to:
   receive a user request;
   dynamically assign the cells to the zones based on the physical characteristics of the user after determining the physical characteristics of the user;
   select a zone from the plurality of zones based on the physical characteristics of the user in response to the request; and
   provide physical access to one or more of the storage cells located in the selected zone.

2. The delivery system of claim 1, comprising lockable doors attached to the storage cells.

3. The delivery system of claim 1, wherein the zones are defined in accordance with vertical and horizontal distance positions on a face of the cabinet.

4. The delivery system of claim 1, wherein the physical characteristics of the user comprise at least one of a height, a weight, a reach, a race, a gait, or an age of the user.

5. The delivery system of claim 4, wherein the control processor is configured to generate a marketing message based on the physical characteristics of the user.

6. The delivery system of claim 1, wherein the control processor is configured to mechanically change a setup of the delivery system based on the physical characteristics of the user.

7. The delivery system of claim 1, wherein the user evaluation device comprises a camera.

8. The delivery system of claim 7, further comprising a communications system, and wherein the controller is configured to control the communications system and the camera to provide the user with a video chat connection to a central service center.

9. The delivery system of claim 1, further comprising an input device configured to receive input from the user to change the selection of the zone.

10. The delivery system of claim 1, wherein:
    the user evaluation device is further configured to detect movement of the user; and
    the controller is configured to generate a marketing message based on the detected movement.

11. The delivery system of claim 1, wherein the user evaluation center is further configured to receive input entered by the user.

12. The delivery system of claim 1, wherein the user request comprises entry of personal information into the system.

13. The delivery system of claim 12, wherein the entry of personal information comprises at least one of:
    scanning a user identification item; or
    receiving a code.

14. The delivery system of claim 1, wherein data corresponding to the physical characteristics of the user are stored in an account associated with the user.

15. A method for receiving, from a user, a delivery item for delivery by a delivery service provider, the method comprising:
    receiving a request from the user to deposit a delivery item in a cabinet, the cabinet comprising a plurality of zones, a plurality of controlled-access storage cells being disposed in each zone in the plurality of zones;
    detecting physical characteristics of the user with a user evaluation device;
    dynamically assigning the cells to the zones based on the physical characteristics of the user after determining the physical characteristics of the user:
    selecting, in response to the request, a zone from the plurality of zones based on the physical characteristics of the user;
    selecting a storage cell in the selected zone;
    receiving the delivery item in the selected cell from the user; and
    providing access to the selected cell to the delivery service provider.

16. The method of claim 15, wherein the zones are defined in accordance with vertical and horizontal distance positions on a face of the cabinet.

17. The method of claim 15, wherein the physical characteristics of the user comprise at least one of a height, a weight, a reach, a race, a gait, or an age of the user.

18. The method of claim 15, further including generating a marketing message based on the physical characteristics of the user.

19. The method of claim 15, further including mechanically changing a setup of the delivery system based on the physical characteristics of the user.

20. The method of claim 15, further including controlling a communications system and a camera to provide the user with a video chat connection to a central service center.

21. The method of claim 15, further including receiving input from the user through an input device to change the selection of the zone.

22. The method of claim 15, further including:
   detecting movement of the user; and
   generating a marketing message based on the detected movement.

23. The method of claim 15, further including storing data corresponding to the physical characteristics of the user in an account associated with the user.

\* \* \* \* \*